United States Patent
Zhong

(10) Patent No.: US 8,857,318 B2
(45) Date of Patent: Oct. 14, 2014

(54) COFFEE MAKER

(75) Inventor: Weijun Zhong, Zhangzhou (CN)

(73) Assignee: Tsann Kuen (Zhangzhou) Enterprise Co., Ltd., Zhang Zhou (CN)

( * ) Notice: Subject to any disclaimer, the term of this patent is extended or adjusted under 35 U.S.C. 154(b) by 0 days.

(21) Appl. No.: 13/564,166

(22) Filed: Aug. 1, 2012

(65) Prior Publication Data

US 2013/0032035 A1    Feb. 7, 2013

(30) Foreign Application Priority Data

Aug. 2, 2011  (CN) .................. 2011 2 0279810 U

(51) Int. Cl.
*A47J 31/047*  (2006.01)
*A47J 31/46*  (2006.01)

(52) U.S. Cl.
CPC ..................... *A47J 31/46* (2013.01)
USPC ............................. 99/293; 99/281

(58) Field of Classification Search
USPC ............. 99/302 R, 283, 298, 295, 302 P, 308, 99/309, 300, 291, 290, 282, 299, 305, 310, 99/311, 312, 288, 281, 280
See application file for complete search history.

(56) References Cited

U.S. PATENT DOCUMENTS

| | | | | |
|---|---|---|---|---|
| 5,463,932 A * | 11/1995 | Olson | | 99/280 |
| 6,526,872 B2 * | 3/2003 | Wong | | 99/282 |
| 7,353,752 B2 * | 4/2008 | Blanc | | 99/298 |
| 2009/0136639 A1 * | 5/2009 | Doglioni Majer | | 426/431 |
| 2011/0094390 A1 * | 4/2011 | Bianchi et al. | | 99/281 |

* cited by examiner

*Primary Examiner* — Henry Yuen
*Assistant Examiner* — Phoung Nguyen
(74) *Attorney, Agent, or Firm* — Rabin & Berdo, P.C.

(57) ABSTRACT

The present invention relates to an equipment for brewing coffee. A water pump, a boiler, a check valve, a water port and a coffee extractor are arranged in the shell of the present invention, the coffee maker is not provided with water tank, the water pump is arranged between the outlet pipe of the boiler and the inlet of the check valve; the outlet of the check valve is communicated with the coffee extractor through the water port. The coffee maker in the present invention can ensure the stability of the water temperature at the water port, so that the coffee is better taste. The coffee maker simplifies the waterway system with low producing cost, high production efficiency, convenient maintenance and easy using.

4 Claims, 3 Drawing Sheets

COFFEE MAKER

FIELD OF THE INVENTION

The present invention relates to an equipment for brewing coffee.

BACKGROUND OF THE INVENTION

FIG. 1 shows the structure diagram of the waterway system of the coffee maker at the prior art: a water tank 10, a water pump 20, a boiler 30, a check valve 40, a water port 50 and a coffee extractor 60 are arranged in the shell of the coffee maker. The outlet pipe 110 of the water tank 10 is communicated with the inlet of the water pump 20. The water port of the water pump 20 is communicated with the inlet pipe 310 of the boiler 30. The outlet pipe 320 of the boiler 30 is communicated with the inlet of the check valve 40, the outlet of the check valve 40 is communicated to the water port 50 through the outlet pipe 410. The coffee extractor 60 is arranged under the water port 50. The coffee powder is contained in the coffee extractor 60. When the users need to make coffee and the power of the coffee maker is on, the cold water in the water tank 10 is pumped into the boiler 30 by the water pump 20 if the water level in the boiler 30 is lower than the provided water level; when the water level in the boiler 30 is equal to the provided water level, the water pump 20 is shut down, and the heater of the boiler 20 start to heat. When the water temperature in the boiler 30 reaches the provided value, the heater of the boiler 30 stops heating and sends the signal that the water temperature reaches the provided value. And then, if the users press the flush button, the water pump 20 runs again, and the heater of the boiler 30 keeps heating, and then the cold water in the water tank 10 is transmitted to the boiler 30, and then the hot water in the boiler 30 is forcibly pushed into the coffee extractor 60 through the check valve 40 and the water port 50, and then the coffee powder in the coffee extractor 60 is thawed by the hot water, the coffee liquid falls into the coffee cup 70 out of the shell. When the volume of the coffee liquid in the coffee cup 70 reaches the desired volume of the users, the flush button is loosen, is the water pump 20 stops running, and the heater of the boiler 30 stops heating. The hot water in the boiler 30 stops entering the coffee extractor 60 through the check valve 40 and the water port 50, and no coffee liquid falls into the coffee cup 70 out of the shell. The check valve 40 can prevent the hot water in the outlet pipe 410 from back flowing.

Even so, there are a plurality of disadvantages of the coffee maker at the prior art: because the cold water in the water tank 10 is needed to be transmitted in to the boiler 30 by the water pump 20 to get the hot water in the boiler 30 during the coffee cooking process of the coffee extractor 60, the water temperature at the water port 50 is unstable. The dropping of the water temperature at the water port 50 will badly affect the coffee from the coffee extractor 60.

SUMMARY OF THE INVENTION

The object of the present invention is to offer a coffee maker with stable water temperature at its water port.

The technical proposal of the present invention is: a coffee maker, a water pump, a boiler, a check valve, an water port and a coffee extractor are arranged in the shell of the coffee maker, the coffee maker is not provided with water tank, the water pump is arranged between the outlet pipe of the boiler and the inlet of the check valve; the outlet of the check valve is communicated with the coffee extractor through is the water port.

The coffee maker in the present invention is not provided with water tank, and the water is directly added in to the boiler. When cooking the coffee, the water in the boiler is boiled to the specified temperature, and then the hot water in the boiler is transmitted to the coffee extractor by the water pump through the check valve and the water port; does not like the prior art, it is not need to transmit the cold water in the water tank 10 into the boiler 30 by the water pump 20 to forcibly push the hot water in the boiler 30 out of the boiler 30 for gaining the hot water in the boiler 30, so that the stability of the water temperature at the water port can be ensured. The coffee maker in the present invention overcomes the defect that the water temperature at the water port is unstable during the coffee cooking process, so that the coffee is better taste. The coffee maker simplifies the waterway system with low producing cost, high production efficiency, convenient maintenance and easy using.

DESCRIPTION OF THE PREFERRED EMBODIMENTS

With the following description of the drawings and specific embodiments, the invention shall be further described in details.

Figure 1:
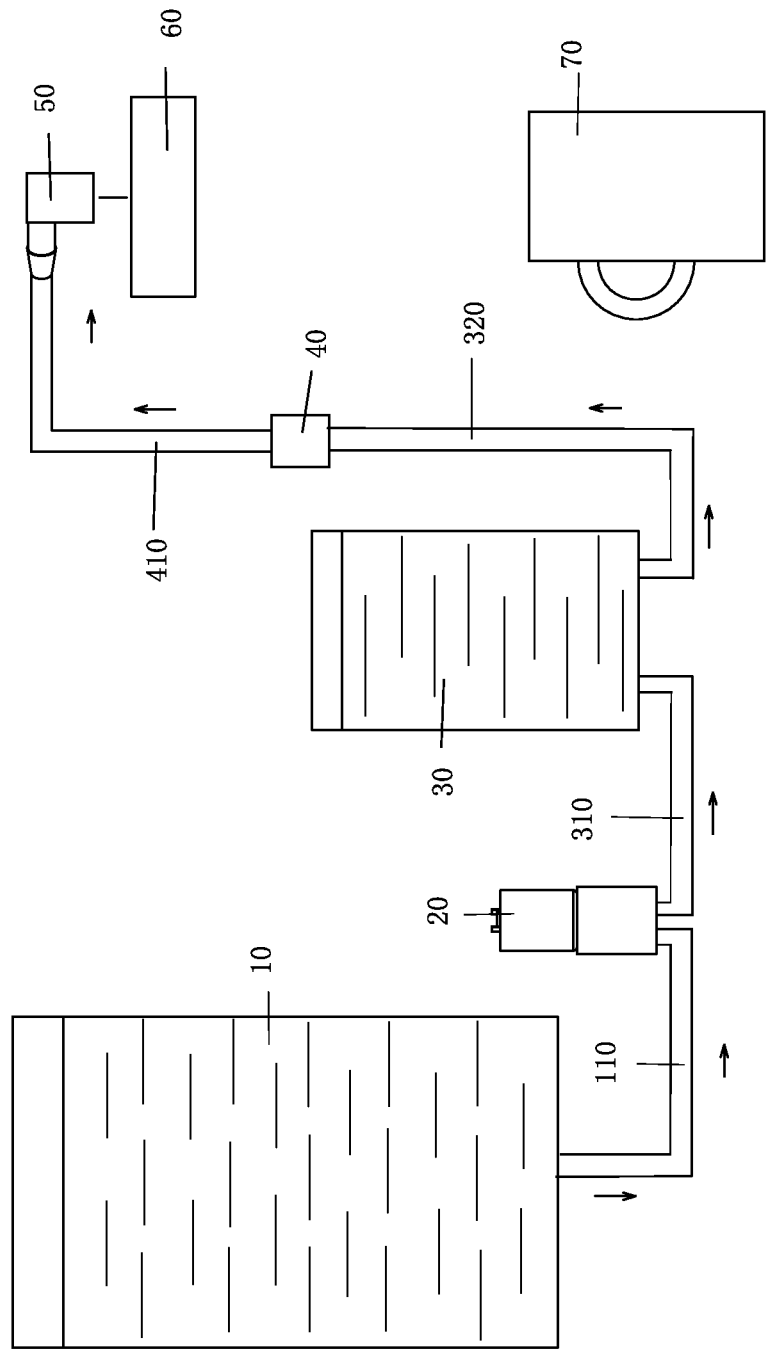
FIG. 1 shows the structure diagram of the waterway system of the coffee maker at the prior art.
Figure 2:
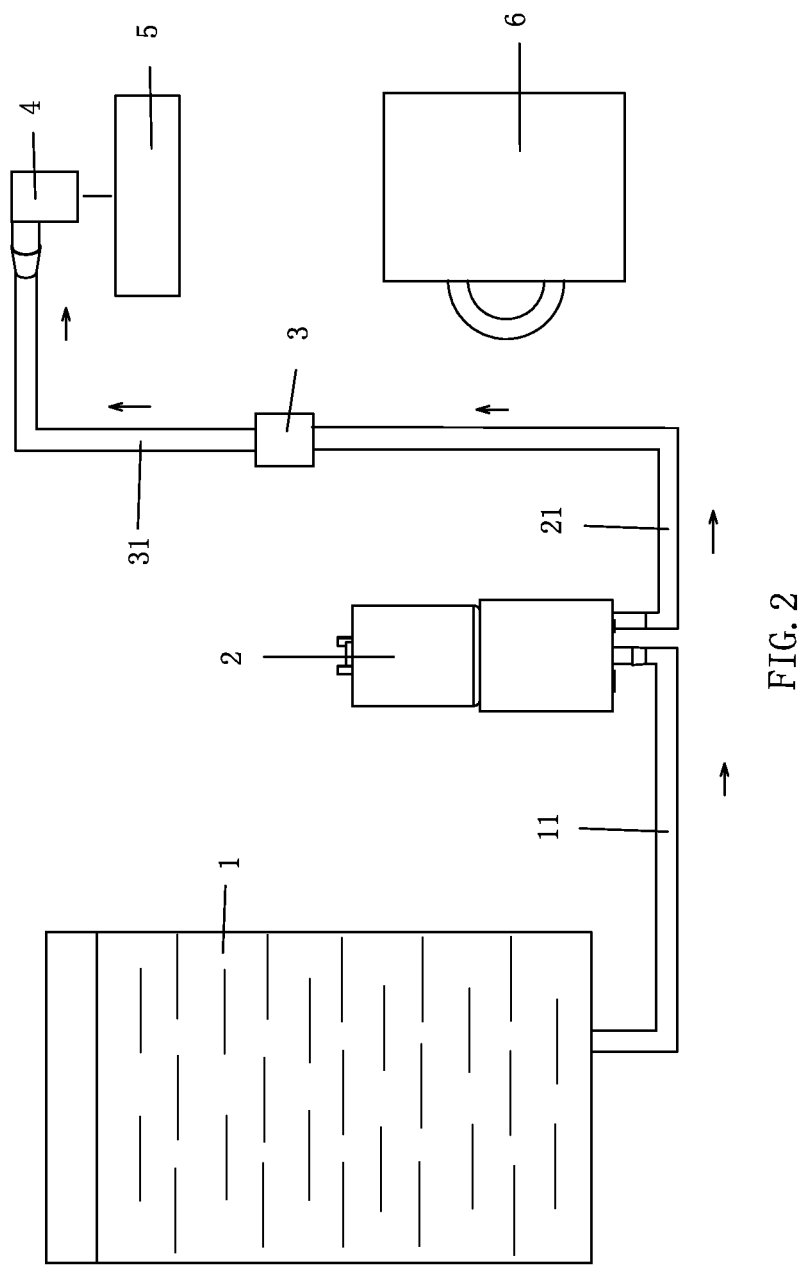
FIG. 2 shows the structure diagram of the waterway system of one embodiment of the coffee maker in the present invention.

FIG. 2 shows the structure diagram of the waterway system of one embodiment of the coffee maker in the present invention: the coffee maker is not provided with a water tank. A boiler 1, a water pump 2, a check valve 3, a water port 4 and a coffee extractor 5 are arranged in the shell of the coffee maker. The outlet pipe 11 of the boiler 1 is communicated with the inlet of the water pump 2. The outlet of the water pump 2 is communicated with the inlet of the check valve 3 through the middle pipe 21. The outlet of the check valve 3 is communicated with the water port 4 through the outlet pipe 31, the water port 4 is communicated with the coffee extractor 5.

Figure 3:
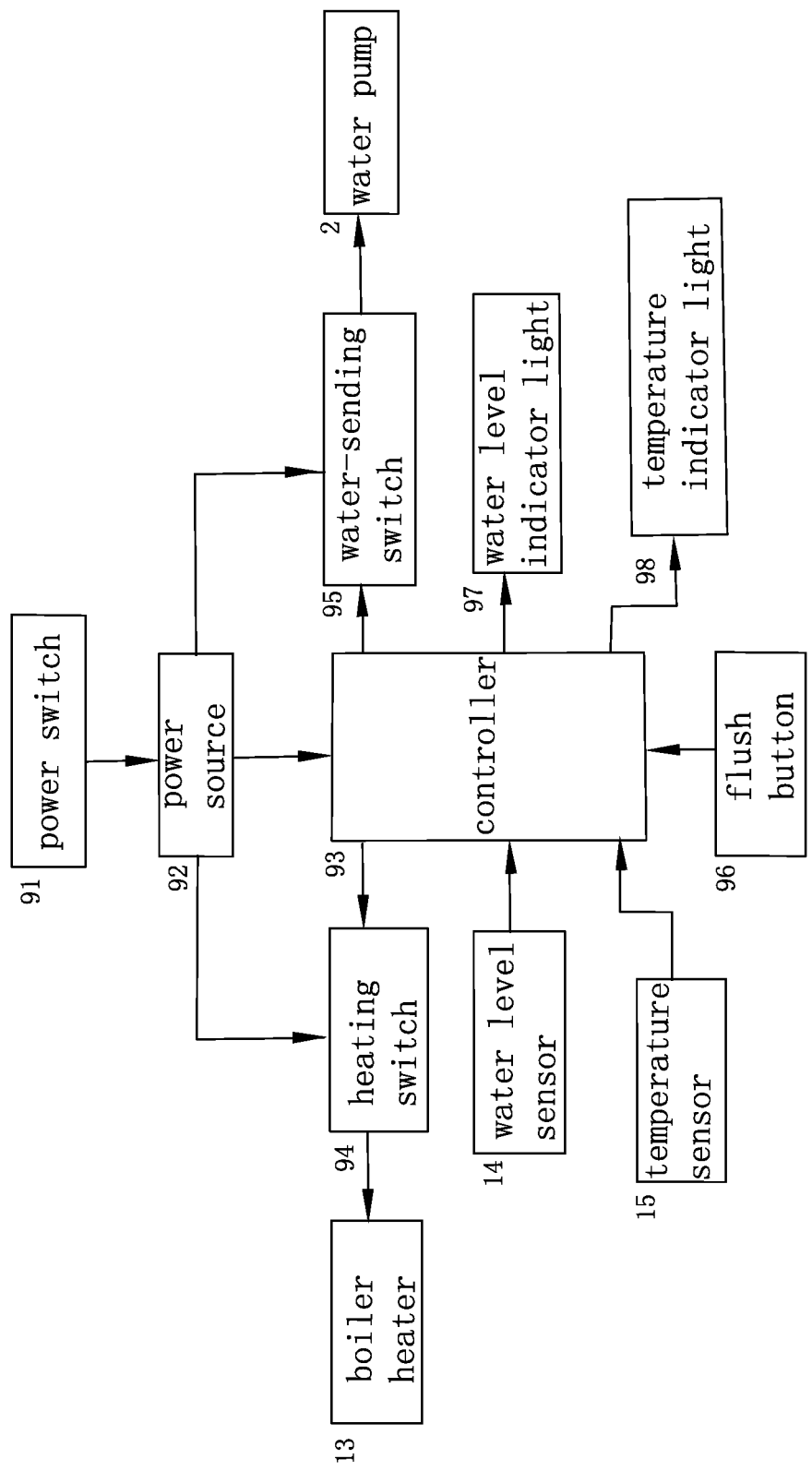
FIG. 3 shows the structure diagram of the control circuit of the embodiment in FIG. 2.

Combining with the control circuit in the FIG. 3, the working mode of the present embodiment is stated. It is very easy to manipulate the coffee maker and achieve whole control of the coffee cooking only through a power switch 91 and a flush button 96.

The users turn on the power switch 91, the power source supplies power to the controller 93, the heating switch 94 and the water-sending switch. At this time, the heating switch 94 and the water-sending switch 95 are off, and the boiler heater 13 and the water pump 2 are at non-operating state. The controller 93 read the water level signal in the boiler 1 offered by the water level sensor 14. If the water level is lower than the provided value, the water level indicator light 97 is turned on by the controller 93, and the alerting signal for adding water is sent to the users; when the water level is equal to the provided value after adding water, the water level indicator light 97 is turned off by the controller 93.

When the water level in the boiler 1 is equal to the provided value, the controller 93 controls the heating switch 94 to supply power to the boiler heater 13, and the boiler heater 13 heats up the water in the boiler 1. When the controller 93 detected that the water temperature in the boiler 1 reaches the provided value through the temperature sensor 15, the controller 93 cuts off the power supply of the boiler heater 13 through the heating switch 94, stops heating and turn on the temperature indicator light 98, sending the signal that the water temperature reaches the provided value to the users.

And then, if the users press the flush button 96, the controller 93 controls the water-sending switch 95 to supply power to the water pump 2. The water pump 2 runs, the hot water in the boiler 1 is forcibly transmitted to the coffee extractor 5 through the outlet pipe 11 of the boiler, the water pump 2, the middle pipe 21, the check valve 3, the outlet pipe 31 and the water port 4, the coffee powder in the coffee extractor 5 is thawed by the hot water, and the coffee liquid falls into the coffee cup 6 out of the shell.

When the users loose the flush button 93, the controller 93 controls the water-sending switch to cut off the power supply to the water pump 2, the water pump 2 stops running, the hot water in the boiler 1 stops entering the coffee extractor 5 through the water pump 2, the check valve 3 and the water port 4, and no coffee liquid falls into the coffee cup 6 out of the shell.

The invention has been described with reference to the preferred embodiments mentioned above; therefore it cannot limit the reference implementation of the invention. It is obviously to a person skilled in the art that structural modification and changes can be carried out without leaving the scope of claims hereinafter and the description above.

What is claimed is:

1. A coffee maker comprising:
    a power switch that is actuatable by a user to an on-position;
    a shell;
    a water pump disposed in the shell;
    a boiler disposed in the shell and containing water, the boiler including an outlet pipe directly connecting to the water pump, the boiler including a boiler heater responsive to the power switch being actuated into the on-position by heating the water contained in the boiler to a provided temperature value;
    a temperature indicator light configured to alert the user that the water, contained in the boiler, has reached the provided temperature value;
    a water level indicator configured to alert the user that the water, contained in the boiler, is lower than a provided water level value,
    a check valve disposed in the shell, the check valve having an inlet and an outlet;
    a water port disposed in the shell;
    a coffee extractor disposed in the shell; and
    a flush button that is actuatable by the user to an on-position,
    in the on-position of the flush button, the water, that is contained in the boiler and that has reached the provided temperature value, is supplied from the boiler by the pump to the inlet of the check valve, then to the water port, and then to the coffee extractor,
    the water pump being disposed downstream from the outlet pipe of the boiler and upstream to the inlet of the check valve, and
    the outlet of the check valve being communicated with the coffee extractor through the water port.

2. The coffee maker according to claim 1, wherein the water, that is contained in the boiler and that has reached the provided temperature value, is supplied from the boiler to the check valve, then to the water port, and then to the coffee extractor, only while the flush button is actuated.

3. A coffee maker comprising:
    a power switch that is actuatable by a user to an on-position;
    a shell;
    a water pump disposed in the shell;
    a boiler disposed in the shell and containing contained water, the boiler including an outlet pipe directly connecting to the water pump, the boiler including a boiler heater for heating the contained water;
    a temperature indicator light;
    a water level indicator light,
    a check valve disposed in the shell, the check valve having an inlet and an outlet;
    a water port disposed in the shell;
    a coffee extractor disposed in the shell;
    a flush button that is actuatable by the user to an on-position; and
    a controller connected with each of the boiler, the power switch, the flush button, the temperature indicator light and the water level indicator light,
    the controller being responsive to the power switch being actuated to the on-position thereof so as to provide power to the boiler heater so that the boiler heater heats the contained water to a provided temperature value,
    the controller detecting a temperature of the contained water to determine whether the contained water has reached the provided temperature value,
    the controller detecting a water level is lower than a provided water level value, and turning on the water level indicator light so as to alert the user to add the water,
    the controller controlling the temperature indicator light to turn on the temperature indicator light so as to alert the user when the contained water has reached the provided temperature value,
    the controller being responsive to the flush button being actuated to the on-position thereof so as to control the water pump to pump the contained water so that the contained water is supplied from the boiler by the pump to the inlet of the check valve, then to the water port, and then to the coffee extractor,
    the water pump being disposed downstream from the outlet pipe of the boiler and upstream to the inlet of the check valve, and
    the outlet of the check valve being communicated with the coffee extractor through the water port.

4. The coffee maker according to claim 3, wherein the contained water that has reached the provided temperature value, is supplied from the boiler to the check valve, then to the water port, and then to the coffee extractor, only while the flush button is actuated.

* * * * *